US006734273B2

(12) United States Patent
Onder

(10) Patent No.: US 6,734,273 B2
(45) Date of Patent: May 11, 2004

(54) HIGH MOLECULAR WEIGHT THERMOPLASTIC POLYURETHANES MADE FROM POLYOLS HAVING HIGH SECONDARY HYDROXYL CONTENT

(75) Inventor: Kemal Onder, Brecksville, OH (US)

(73) Assignee: Noveon IP Holdings Corp., Cleveland, OH (US)

( * ) Notice: Subject to any disclaimer, the term of this patent is extended or adjusted under 35 U.S.C. 154(b) by 37 days.

(21) Appl. No.: 09/781,791

(22) Filed: Feb. 12, 2001

(65) Prior Publication Data

US 2002/0156225 A1 Oct. 24, 2002

(51) Int. Cl.$^7$ ............................................... C08G 18/48
(52) U.S. Cl. ........................................... 528/76; 428/98
(58) Field of Search ............................... 528/76; 428/98

(56) References Cited

U.S. PATENT DOCUMENTS

| 3,829,505 | A |   | 8/1974  | Herold            |
| 4,124,572 | A |   | 11/1978 | Mao               |
| 4,131,731 | A |   | 12/1978 | Lai et al.        |
| 4,202,957 | A |   | 5/1980  | Bonk et al.       |
| 4,239,879 | A |   | 12/1980 | Fabris et al. ................... 528/76 |
| 5,061,777 | A | * | 10/1991 | Yoda et al.       |
| 5,185,420 | A | * | 2/1993  | Smith et al.      |
| 5,677,413 | A | * | 10/1997 | Barksby et al.    |

FOREIGN PATENT DOCUMENTS

| CA | 2233664    | 5/1998  |
| EP | 0525567    | 2/1993  |
| EP | 0807651    | 11/1997 |
| WO | WO 9721750 | 6/1997  |

* cited by examiner

Primary Examiner—Rachel Gorr
(74) Attorney, Agent, or Firm—Joe A. Powell; Thoburn T. Dunlap; Daniel J. Hudak

(57) ABSTRACT

Thermoplastic polyurethane compositions are prepared from polyols having high secondary hydroxyl content, diisocyanates, chain extenders and catalysts. The resulting polyurethanes have high molecular weight and can be prepared by a one-shot process wherein the reactants and any additional desired components are brought together and reacted simultaneously or substantially simultaneously.

30 Claims, No Drawings

HIGH MOLECULAR WEIGHT THERMOPLASTIC POLYURETHANES MADE FROM POLYOLS HAVING HIGH SECONDARY HYDROXYL CONTENT

FIELD OF THE INVENTION

The present invention relates to thermoplastic polyurethanes and films and numerous articles which can be made therefrom. More particularly, the invention relates to linear thermoplastic polyurethanes having high molecular weight that are made from polyols having high secondary hydroxyl content. The thermoplastic polyurethanes of the present invention have excellent physical properties and can be made by a one-shot continuous polymerization method such as in an extruder.

BACKGROUND OF THE INVENTION

Heretofore, thermoplastic polyurethane polymers were typically formulated with polyols having predominantly primary hydroxyl groups.

Canadian Application No. 2,233,664 to Scholz relates to a process for preparing thermoplastic polyurethanes by reacting (a) isocyanates with (b) compounds reactive toward isocyanates and having a molecular weight of from 500 to 10,000 g/mol. in the presence or absence of (c) chain extenders having a molecular weight of less than 500 g/mol. (d) catalysts and/or (e) customary auxiliaries and additives, the component (b) used comprises at least one polyether polyalcohol (b1) comprising polyoxypropylene and polyoxyethylene units and having a molecular weight of from 500 to 10,000 g/mol, an unsaturation of less than 0.07 meq/g and a primary hydroxyl group content of from 80 to 100%. U.S. Pat. No. 4,202,957 to Bonk et al. relates to polyurethane polyether-based elastomers which are thermoplastic, recyclable and have increased high temperature resistance which permits fabrication by injection molding. The elastomers are the product of reaction of 4,4'methylenebis(phenyl isocyanate), a particular group of polypropylene oxide-polyethylene oxide block copolymers and an extender [straight chain aliphatic diols $C_{2-6}$ or the bis(2-hydroxyethyl ether) of hydroquinone or resorcinol]. The block copolymers have at least 50 percent primary hydroxyl groups, a pH in the range of 4.5 to 9, a content of alkali metal ion less than 25 ppm and a molecular weight of 1000 to 3000. In a particularly preferred embodiment the elastomers are prepared by replacing up to 25 percent by equivalents of the extender by certain diols (polyethylene glycols up to 1500 M.W. preferred). The polyether diols are polyoxypropylene polyoxyethylene, block copolymeric glycols which are obtained by first polymerizing propylene oxide and then reacting the resulting polyoxypropylene glycol with ethylene oxide in a multi-step process, see column 3, lines 14–20. The multi-step process for performing the polyether diols is performed using a basic catalyst, see column 3, lines 21–33.

Thermoplastic polyurethanes formulated with polyols having high primary hydroxyl group content are more costly than the compositions of the present invention which utilize polyols having a substantial amount of secondary hydroxyl groups.

Although mixtures of primary and secondary hydroxyl group containing polyols are not new, previously they have primarily only been used in thermoset polyurethanes such as in coatings, sealants and foams; where high molecular weights and useful properties can only be achieved by chemical cross-linking.

Antipodally, the polyurethanes of the present invention are not thermosets, but instead are thermoplastics which are substantially linear and free of cross-links.

SUMMARY OF THE INVENTION

The thermoplastic polyurethanes of the present invention are prepared from reactants comprising polyether polyols having high secondary hydroxyl content, at least one polyisocyanate, at least one chain extender and optionally, at least one catalyst. The polyurethane compositions are substantially linear, substantially non-thermoset and hence substantially free of cross-links, and have high molecular weights which display excellent mechanical properties comparable to high primary hydroxyl containing polytetramethylene ether glycol (PTMEG) polyols which are relatively more expensive to produce and utilize than the polyols of the present invention.

Polyurethanes as described herein can be prepared by a one-shot polymerization process, wherein all of the reactants are brought simultaneously or substantially simultaneously and reacted. The one-shot process is preferably performed in an extruder.

The thermoplastic polyurethanes can be formed into tubings, cable jacketing, and breathable films for such uses as roofing membranes and house wrap applications. It has been found that the films prepared by the invention have excellent water vapor transmissibility.

DETAILED DESCRIPTION OF THE INVENTION

The thermoplastic polyurethane polymers of the present invention, comprise the reaction product of polyether-based polyols, polyisocyanates, preferably diisocyanates, chain extenders, and optionally, catalyst.

Polyols

The present invention advantageously utilizes a polyol component including polyether polyols of high secondary/low primary hydroxyl group content which are produced in a single step process, wherein all of the monomers are reacted at simultaneously or substantially the same time using double metal cyanide catalysts. Polyether polyols produced by this method are randomly polymerized and possess low unsaturation with functionality approaching two, making them suitable for the manufacture of high molecular weight, linear thermoplastic polyurethanes. Since no base neutralization and catalyst purification/removal are necessary, such as with the conventional base catalyzed urethane polyether polyols, the manufacturing process of the high secondary/low primary hydroxyl content polyethers polyols is cost competitive. The high secondary content polyether polyols importantly are substantially free of monofunctional impurities, which is a requirement for making high molecular weight linear thermoplastic urethanes.

Several different classes of polyols can be used in the polyol component of the polyurethanes of the present invention. At least a portion of the total polyol component of the present invention is prepared from polyalkylene oxides which result in polyether polyols having high secondary hydroxyl group (—OH) content or low primary hydroxyl group content. An important feature of the present invention is that the polyether polyol contains generally about 20, 30 or 35 to about 95 or 100 percent, desirably from about 40, 51, 53, or 65 to about 80 85, or 90 and preferably from about 50, 51 or 52 to about 55, 60, 65, 80, or 85 percent of secondary hydroxyl groups based on the total number of hydroxyl groups in the high secondary hydroxyl content polyether polyols.

The polyether polyols of the present invention having high secondary hydroxyl content are prepared from one or more alkylene oxides having from 2 to about 6 carbon atoms such as ethylene oxide, propylene oxide, butylene oxide, and the like. Desirably, the polyether polyol is often a polypropylene oxide copolymer with at least one additional alkylene oxide such as ethylene ioxide, the amount of propylene oxide desirably being at least about 60 percent by weight and preferably at least about 75 percent to about 100 percent by weight of the copolymer. While butylene oxide can be utilized, the same is generally not preferred due to its high cost and poor vapor transmissibility properties. The polyether polyols can be produced by reacting a glycol, such as propylene glycol with propylene oxide, and ethylene oxide.

The high secondary hydroxyl content polyether polyols are commercially available from the Olin Corporation of Cheshire, Conn. as Poly-L, the Bayer AG of Leverkusen, Germany, as Arcol R-2835. The high secondary hydroxyl content polyols are generally prepared in the presence of various catalysts and desirably a double-metal cyanide catalyst. The use of double-metal cyanide catalyst, such as zinc hexacyanometallate made by Arch Chemical, and the preparation of high molecular weight polyols therewith is known to the art. For example, U.S. Pat. No. 3,829,505 assigned to the General Tire & Rubber Company, discloses the preparation of high molecular weight diols, triols, etc., using double-metal cyanide catalysts. The number average molecular weight of the polyether polyols of the present invention is generally from about 600 to about 5,000, desirably from about 700 to about 2,500, and preferably from about 800 to about 1,500.

The polyether polyols of the present invention containing high secondary hydroxyl content can be blended with other classes of polyols generally not containing high secondary hydroxyl content, that is generally up to 50 weight percent, desirably less than or equal to 40, 30, or 25 weight percent, and preferably less than or equal to 15 weight percent based on the total polyol component (high secondary hydroxyl content polyether polyols and other low secondary hydroxyl content polyols). Other such classes of polyols include hydroxyl terminated polyesters, low secondary content hydroxyl terminated polyethers, hydroxyl terminated polycarbonates, and hydroxyl terminated polycaprolactams.

The class of hydroxyl terminated polyesters are generally polyesters., often linear polyesters, having a number average molecular weight, $M_n$, of at least 500 and typically no more than 10,000 to provide the polyurethane with a distribution of hard and soft segments. The number average molecular weight of the hydroxyl terminated polyester is typically in the range of about 700 to about 5,000, and often is in the range of about 700 to about 4,000. The number average molecular weight can be determined, for example, by assay of the number of terminal functional groups for a given weight of polymer, Suitable hydroxyl terminated polyesters generally have an acid number of 1.3 or less and typically 0.8 or less. The acid number refers to the number of milligrams of potassium hydroxide needed to neutralize one gram of the hydroxyl terminated polyester. Suitable hydroxyl terminated polyesters are commercially available from companies such as, for example, Witco Corp. of Perth Amboy, N.J., Inolex Chemical Co. of Philadelphia, Pa., and Ruco Polymer Corp. of Hicksville, N.Y.

The hydroxyl terminated polyester polymers can be produced by, for example, (1) an esterification reaction of one or more dicarboxylic acids or anhydrides using one or more glycols or (2) a transesterification reaction of one of more esters of dicarboxylic acids using one or more glycols. Mole ratios generally in excess of more than one mole of glycol to acid, anhydride, or ester are preferred so as to obtain linear chains having a preponderance of terminal hydroxyl groups.

Suitable dicarboxylic acids for preparing a hydroxyl terminated polyester intermediate include aliphatic, cycloaliphatic, and aromatic dicarboxylic acids. A single dicarboxylic acid or a combination of dicarboxylic acids can be used. Typically, the dicarboxylic acids have a total of from 4 to about 15 carbon atoms. Examples of suitable dicarboxylic acids include succinic, glutaric, adipic, pimelic, suberic, azelaic, sebacic, dodecanedioic, isophthalic, terephthalic, and cyclohexane dicarboxylic acids, and the like. Anhydrides of the above dicarboxylic acids, such as phthalic anhydride, tetrahydrophthalic anhydride, and the like, can also be used. Adipic acid is a commonly used dicarboxylic acid.

If the transesterification route for formation of the hydroxyl terminated polyester is utilized, esters of the dicarboxylic acids described above can be used. These esters typically include an alkyl group, usually having 1 to 6 carbon atoms, in place of the acidic hydrogen of the corresponding acid functionalities.

The glycols which are reacted to form the hydroxyl terminated polyester intermediate can be aliphatic, aromatic, or combinations thereof. The glycols typically have a total of from 2 to 12 carbon atoms. Suitable glycols include, for example, ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. Commonly used glycols are 1,4-butanediol and 1,6-hexanediol.

The class of low secondary hydroxyl content polyether polyols are derived from a diol or polyol having a total of from 2 to about 15 carbon atoms. By low secondary hydroxyl content, it is meant that the polyether polyols have a secondary hydroxy content less than the above defined ranges for the high secondary hydroxyl content polyether polyols. For example, an alkyl diol or glycol can be reacted with an ether, such as an alkylene oxide having from 2 to 6 carbon atoms. Suitable alkylene oxides include, for example, ethylene oxide, propylene oxide, or mixtures thereof. Suitable hydroxyl terminated polyethers are commercially available from companies such as, for example, E. I. DuPont de Nemours Co., Inc. of Wilmington, Del., BASF Corp. of Parsippany, N.J. and Great Lakes Chemical Corp. of Lafayette, Ind.

Typically, the number average molecular weight of the low secondary hydroxyl content polyether polyols range from about 500 to about 5,000. Often the number average molecular weight of the low secondary hydroxyl content polyether polyol range from about 700 to about 3,000.

The class of hydroxyl terminated polycarbonates are commercially available from companies such as, for example, C. P. Hall Co. of Chicago, Ill. Suitable hydroxyl terminated polycarbonates can be prepared by reacting a glycol with a carbonate. U.S. Pat. No. 4,131,731, incorporated herein by reference, describes hydroxyl terminated polycarbonates, their preparation and how they can be utilized. Such polycarbonates are typically linear. The number average molecular weight of the hydroxyl terminated polycarbonates is generally at least about 500 and typically not more than 3,000.

The class of hydroxyl terminated polycaprolactones are commercially available from companies such as, for example, Union Carbide Corp. of Danbury, Conn. Hydroxyl terminated polycaprolactones can be formed by reaction of a caprolactone with a glycol. Suitable caprolactones include ε-caprolactone and methyl ε-caprolactone. Suitable glycols include, for example, ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. Methods for the preparation of hydroxyl terminated polycaprolactones are generally known to those of ordinary skill in the art.

The polyol component of the present invention has an unsaturation content of generally less than 0.05 meq/gram, desirably less than about 0.02 or 0.03 meq/gram and preferably less than about 0.015 meq/gram, (milliequivalents per gram) per polyol, as can be determined by methods well known to those skilled in the art. The number average molecular weight of the polyol component of the present invention, which can comprise different polyols as defined above, is generally from about 600 to about 5,000, desirably from about 700 to about 2,500, and preferably from about 800 to about 1,500. The average hydroxyl functionality of the polyol component is generally from about 1.8 to about 2.2, desirably from about 1.90 to about 2.10, and preferably from about 1.95 to about 2.00 or 2.05.

As stated above, the polyol component of the present invention can contain mixtures of high secondary hydroxyl containing polyether polyols and polyols containing lower or even no secondary hydroxyl content. Such mixtures are often utilized in order to minimize the cost of the product without lessening beneficial or necessary properties.

Polyisocyanates

The polyurethanes of the present invention also contain an isocyanate component. In order to form large linear polyurethane chains, di-functional or polyfunctional isocyanates are utilized, with diisocyanates being preferred. Suitable polyisocyanates are commercially available from companies such as, but not limited to, Bayer AG of Leverkusen, Germany, The BASF Corporation of Parsippany, N.J., The Dow Chemical Company of Midland, Mich., and Huntsman Chemical of Utah. The polyisocyanates of the present invention generally have a formula $R(NCO)_n$, where n is usually an integer of 2 to 4 and preferably about 2 being preferred. R can be an aromatic, cycloaliphatic, an aliphatic, or combinations thereof having from 2 to 20 carbon atoms. Examples of polyisocyanates include, but are not limited to diphenylmethane-4,4'-diisocyanate (MDI); toluene-2,4-diisocyanate (TDI); toluene-2,6-diisocyanate (TDI); methylene bis (4-cyclohexylisocyanate ($H_{12}$ MDI); 3-isocyanatomethyl-3,5,5-trimethyl-cyclohexyl isocyanate (IPDI); 1,6-hexane diisocyanate (HDI); naphthalene-1,5-diisocyanate (NDI); 1,3- and 1,4-phenylenediisocyanate; triphenylmethane-4,4',4"-triisocyanate; polyphenylpolymethylenepolyisocyanate (PMDI); m-xylene diisocyanate (XDI); 1,4-cyclohexyl diisocyanate (CHDI); isophorone diisocyanate; isomers and mixtures or combinations thereof. The preferred isocyanates, are diphenylmethane-4,4'-diisocyanate (MDI), including polymeric MDI, and also $H_{12}$MDI which produces polyurethanes with low yellow color.

Chain Extenders

Chain extenders are desirably employed in the polyurethane formulations of the present invention generally to increase the molecular weight thereof, and are well known to the art and to the literature. Suitable chain extenders generally include organic diols or glycols having a total of from 2 to about 20 carbon atoms such as alkane diols, aromatic diols, alkylaromatic diols, and the like. Alkane diols which have a total from about 2 to about 6 carbon atoms are often utilized with examples including ethanediol, 1,6-hexanediol, 1,3-butanediol, 1,5-pentanediol and preferably 1,4-butanediol. Dialkylene ether glycols can also be utilized such as diethylene glycol and dipropylene glycol. Examples of suitable aromatic glycols include 1,4-benzenedimethylol benzene glycol, 1,2-cyclopentanediol, and the like. Examples of suitable alkylaromatic glycols include bisethoxy hydroquinone, benzene glycol, p-dimethylol benzene, and the like. Still other suitable chain extenders are cycloaliphatic gylcols such as 1,4-cyclohexanedimethanol (CHDM) and aromatic-aliphatic glycols such as 1,4 bis(2-hydroxyethoxy) benzene (HQEE). Mixtures of the above noted chain extenders can also be utilized.

The preferred chain extenders of the present invention include 1,4-butanediol, ethylene glycol, diethylene glycol, 1,6-hexane diol, 1,4-cyclohexanedimethanol (CHDM), 1,4 bis(2-hydroxyethoxy) benzene (HQEE), and 1,4-benzenedimethylol. The amount of the one or more chain extenders utilized is based upon the total weight of the thermoplastic polyurethane forming components, i.e. the chain extender, the polyol component, and the polyisocyanate. The amount of chain extender utilized generally is from about 3 to about 50 percent by weight, desirably from about 4 to about 25 percent by weight, and preferably from about 5 to about 15 percent by weight based on the total weight of the polyol component and the polyisocyanate.

The mole ratio of polyisocyanate functional groups to total hydroxyl functional groups of the polyol component and chain extender is generally from about 0.95 to about 1.10 and preferably from about 0.98 to about 1.03.

Catalysts

Catalysts are optionally, but preferably used in the polyurethane reaction mixtures of the present invention. Any of the catalysts conventionally employed or known in the art and to the literature to catalyze the reaction of an isocyanate with a reactive hydrogen containing compound can be employed for this purpose. Such catalysts include organic and inorganic acid salts of, and organometallic derivatives of, bismuth, tin, iron, antimony, cobalt, thorium, aluminum, zinc, nickel, cerium, molybdenum, vanadium, copper, manganese and zirconium, as well as phosphines and tertiary organic amines. Representative organotin catalysts include stannous octoate, dibutyltin dioctoate, dibutyltin diluarate, and the like. Representative tertiary organic amine catalysts include triethylamine, triethylenediamine, N,N,N'N'-tetramethylethylenediamine, N,N,N'N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like.

The amount of catalyst employed is generally within the range of about 20 to about 500 parts by weight per million parts by weight of the total weight of the polyisocyanate(s), polyol component, and chain extender(s). Mixtures of the above noted catalysts can likewise be utilized. It is desirable to use minimal amounts of the catalyst in order to minimize side reactions. Preferred catalysts include stannous octoate, dibutyltin dioctoate, and dibutyltin diluarate.

In addition to the above-identified components, the polyurethane compositions of the present invention can also contain various additives, pigments, dyes, fillers and the like, utilized in conventional amounts which are well known to the art and to the literature.

Generally additives are utilized which impart desired properties to the thermoplastic polyurethanes such as various antioxidants, various ultraviolet light inhibitors, waxes such as amide waxes and ester waxes, thickening agents, and the like. The fillers, when utilized, are generally mineral fillers, that is inorganic, and include ground mica, talc, kaolin clay, calcium carbonate, calcium sulfite, colloidal silica, fumed silica, wollastonite, hollow glass microspheres, glass, carbon and graphite fibers, various metallic oxides such as zinc, titanium zirconium, and the like, ground quartz, various metallic silicates, metallic powders such as lead, aluminum, bronze, and the like.

If it is desired that the polyurethane composition of the present invention have a color or hue, any conventional pigment or dye can be utilized in conventional amounts. Hence, any pigment known to the art and to the literature can be utilized as for example titanium dioxide, iron oxide, carbon black, and the like, as well as various dyes provided that they do not interfere with the various urethane reactions.

The thermoplastic polyurethane elastomers of the invention can be prepared by processes which are conventional in the art for the synthesis of polyurethane elastomers such as but not limited to a two-step prepolymer process or preferably, a one-shot (master batch) technique. In the two-step process, the prepolymer is formed by reacting the polyol component with the polyisocyanate component to form an isocyanate terminated prepolymer which is subsequently chain extended. In the preferred one-shot procedure, all of the reactants are brought together and simultaneously or substantially simultaneously reacted. The one-shot procedure is preferably performed in an extruder, e.g. single screw, twin screw (desired), wherein the formative components, i.e. the polyol(s), the polyisocyanate(s), and the chain extender(s), the catalyst(s), and any other additives, etc., if desired, are introduced individually or as a mixture into the extruder, and reacted at a temperature generally from about 100° C. to about 300° C., desirably from about 150° C. to about 250° C., and preferably from about 150° C. to about 240° C.

The resulting polyurethanes of the present invention have a weight average molecular weight generally from about 75,000 to about 400,000, desirably from about 125,000 to about 300,000, and preferably from about 150,000 to about 250,000, measured by gel permeation chromatography against polystyrene standards. The polyurethanes generally have a hardness which ranges from about 65 Shore A to about 70 Shore D. The polyurethanes are essentially linear with molecular weight per branch point greater than or equal to 5,000 or 10,000 number average. The weight percentage of the polyisocyanate in the polymer generally ranges from about 10% to about 60% and preferably from about 15 or 20% to about 50% by weight based on the total weight of the polyurethane composition.

The resulting thermoplastic polyurethane can be extruded into any desired end product or form, or can be cooled and granulated for storage or bulk shipping. The extrudate can also be immediately further processed to give a desired final end-use product.

The thermoplastic polyurethanes of the present invention advantageously are suitable for many applications, including, but not limited to, membranes, breathable films or sheets which can be utilized for house wrap, roofing materials or membranes, tubing, wire and cable jacketing, molded parts, hoses, films for lamination, waistbands, and elastic structures.

The sheets or monolithic films formed from polyurethane compositions of the present invention are advantageously suitable for use as "house wrap" as they allow moisture vapor a passageway from one side of the film to the other.

It is preferred, that the polyurethane sheets of the present invention are apertureless and free of punctures or porosity. The polyurethane sheets and films are breathable and have a high affinity for water ($H_2O$) vapor molecules believedly due to the built in ethylene oxide units in their backbones from the polyol component. This high affinity attracts water vapor molecules which attach themselves or become attached to the film due to difference in potential energy levels. Subsequently, the water vapor diffuses through the film, generally through hydrogen bonding, to the film side where vapor pressure is lower. The sheets or films thus selectively allow water vapor to pass therethrough but do not allow bulk passage of water.

The moisture vapor transmission rate of the polyurethane films and sheets of the present invention is generally greater than 2,000 $g/m^2$ per day, desirably greater than 2,500 $g/m^2$ per day, and preferably greater than 3,000 or 4,000 $g/m^2$ per day.

Previously, films which have been utilized in house wrap applications included breathable fabrics or polyolefin films which were perforated and porous in order to make them breathable. Advantageously, as stated above, sheets and films of the present invention are breathable even when unperforated. Sheets and films of the present invention can be formed in any desired thickness, and when used for house wrap or the like applications, are generally from about 0.5 mils to about 10 mils, and preferably from about 1 mil to about 4 mils in thickness. The sheets and films of the present invention can have a backing layer applied thereto. The backing layer can be any woven or nonwoven substrate such as paper or cellulose product, and polymer backings such as polyethylene or polyester.

As stated above, the films of the present invention are flexible and have excellent physical properties especially against water leaks commonly found in present microporous films.

The present invention will be better understood by reference to the following examples which serve to illustrate the invention, but not to limit the same.

EXAMPLES

Example 1

Preparation of High Molecular Weight TPU from 74.8% High Secondary Hydroxyl Content Polyols The polyether polyol Arcol-2835 has a molecular weight of 1360 with a primary hydroxyl group content of 25.2% and is charged into a heated (90° C.) and agitated tank. A second preheated (50° C.) tank was charged with the chain extender 1,4-butanediol. A third preheated (55° C.) agitated tank was charged with diphenylmethane-4,4'-diisocyanate (MDI). The ingredients of three tanks were metered into the throat of a 40 mm twin-screw co-rotating extruder made by Werner & Pfleiderer, Ramsay, N.J. The extruder had 11-barrel sections, which were heated between 190° C. to 205° C. The end of the extruder was coupled to an underwater pelletizer after a die equipped with screen packs. A thermoplastic polyurethane (TPU) formulation was run continuously by metering 33.368 parts of MDI, 8.169 parts of 1,4-butanediol, and 57.958 parts of Arcol-2835 polyether polyol with 50 ppm of tin octoate catalyst at a total throughput rate of 150 lbs/hr, underwater pelletized and collected in heated (105° C.) silo to finish and dry the product for 3 hours. The polymer produced above was extruded into 2-mil film and 30 mil thick sheet on a 1 in. diameter single screw extruder made by Killion, Verona, N.J. The extruded film and sheet was then cut into test pieces and tested for properties according to ASTM producing following results shown in Table I. Moisture vapor transmission (MVT) was measured on 2 mil thick films using the desiccant method according to ASTM Method #E96-95. The value above 2500 g/m²/day is considered adequate by construction industry using these films as membranes for barrier structures. The above-noted formulation is at least suitable for membranes such as house wrap, roofing membranes, and breathable laminated textiles.

TABLE I

| | | |
|---|---|---|
| GPC Mw | 220,885 | |
| Hardness, Shore A | 84 | |
| Sample Thickness | 30 mils | 2 mils |
| Tensile Strength on films | | |
| Stress at 50% Strain, psi | 620 | 840 |
| Stress at 100% Strain, psi | 770 | 980 |
| Stress at 200% Strain, psi | 970 | 1270 |
| Stress at 300% Strain, psi | 1350 | 1590 |
| Stress at 400% Strain, psi | 1980 | 2180 |
| Stress at 500% Strain, psi | 2960 | 3230 |
| Stress at Break, psi | 5130 | 4180 |
| Strain at Break, % | 620 | 560 |
| MVT @ 38° C./90% RH gm/m²/day | — | 4520 |
| Increase in Length mm/100 mm After water immersion | — | 0.25 |
| Tensile Set @ 200% Strain, % | 13 | |
| Graves Tear, lbf/in | 420 | |
| Specific Gravity | 1.1480 | |
| Trouser Tear, lbf/in | 100 | |
| Taber Abrasion², loss in mass, mg | | |
| CS-17 Wheel | 0 | |
| H-22 Wheel | 44 | |
| Kofler MPt. ° C. | — | — |
| Vicat³, ° C. | 70 | |

Example 2
Preparation of High Molecular Weight TPU from 74.8% High Secondary OH Content Polyols The polyether polyol Arcol-2835 has a molecular weight of 1360 with a primary hydroxyl group content of 25.2% is charged into a heated (90° C.) and agitated tank. A second preheated (50° C.) tank was charged with the chain extender 1,4-butanediol. A third preheated (55° C.) agitated tank was charged with diphenylmethane-4,4'-diisocyanate (MDI). The ingredients of the three tanks were metered into the throat of a 40 mm twin-screw co-rotating extruder made by Werner & Pfleiderer, Ramsay, N.J. The extruder had 11-barrel sections, which were heated between 375° F. to 400° F. The end of the extruder was coupled to an underwater pelletizer after a die equipped with screen packs. A thermoplastic polyurethane (TPU) formulation was run continuously by metering 37.461 parts of MDI, 10.037 parts of 1,4-butanediol, and 51.997 parts of Arcol-2835 polyether polyol with 50 ppm of tin octoate catalyst at a throughput rate of 150 lbs/hr underwater pelletized and collected in heated (105° C.) silos to finish and dry the product. The polymer produced above was extruded into 30 mil thick sheet on a 1 in. diameter single screw extruder made by Killion, Verona, N.J. The extruded sheet was then cut into test pieces and tested for properties according to ASTM method #E96-95 producing the following results shown in Table II.

The polymer of example 2 was extruded into flexible pneumatic tubing of 8 mm OD and 1 mm wall thickness using a 2½" diameter single screw Killion extruder fitted with a tubing die. The extruder had 5 independently heated zones kept at temperatures from 195° C. to 210° C. The transition adapter and tubing die temperatures were set at 226° C. The extrusion rate was 84 lb/hr. at a screw speed of 25 RPM. The above-described composition is a suitable formulation at least for cable, hoses, tubes and general purpose liners.

TABLE II

| Property | Conventional TPU PTMEG Based (100% Primary OH/ 0% Secondary OH content polyol)^A | TPU from Example 2 | TPU from Example 2 |
|---|---|---|---|
| GPC Mw | | 373,264 | 179,564 |
| Hardness, Shore A | 89 | 89 | 89 |
| Tensile Strength on films | 30 mils | 30 mils | 30 mils |
| Stress at 50% Strain, psi | — | 880 | 850 |
| Stress at 100% Strain, psi | 1201 | 1080 | 1040 |
| Stress at 200% Strain, psi | 1530 | 1400 | 1350 |
| Stress at 300% Strain, psi | 1978 | 2030 | 1940 |
| Stress at 400% Strain, psi | 2589 | 3190 | 2950 |
| Stress at 500% Strain, psi | 3300 | 5310 | 4680 |
| Stress at Break, psi | 4080 | 6230 | 5280 |
| Strain at Break, % | 600 | 530 | 530 |
| Tensile Set @ 200% Strain, % | 27 | — | 17 |
| Graves Tear, lbf/in | 541 | 412 | 487 |
| Specific Gravity | — | — | 1.1626 |
| Trouser Tear, lbf/in | | 200 | 109 |
| Taber Abrasion | | | |
| CS-17 Wheel | 5 | — | 2 |
| H-22 Wheel | — | — | 64 |
| Vicat³, ° C. | 96 | — | 98 |

^AEstane 58887 available from The B. F. Goodrich Company

Example 3
Preparation of High Molecular Weight TPU from 74.8% High Secondary Hydroxyl Content Polyols The polyether polyol Arcol-2835 has a molecular weight of 1360 with a primary hydroxyl group content of 25.2% is charged into a heated (90° C.) and agitated tank. A second preheated (50° C.) tank was charged with the chain extender 1,4-butanediol. A third preheated (55° C.) agitated tank was charged with diphenylmethane-4,4'-diisocyanate (MDI). The ingredients of three tanks were metered into the throat of a 40 mm twin-screw co-rotating extruder made by Werner & Pfleiderer, Ramsay, N.J. The extruder had 11-barrel sections, which were heated between 190° C. to 205° C. The end of the extruder was coupled to an underwater pelletizer after a die equipped with screen packs. A thermoplastic polyurethane (TPU) formulation was run continuously by metering 41.7 parts of MDI 12.06 parts of 1,4-butanediol and 45 parts of Arcol-2835 polyether polyol with 50 ppm of tin octoate catalyst at a throughput rate of 150 lbs/hr. The thermoplastic polyurethane was underwater pelletized and collected in heated (105° C.) silos to finish and dry the product which had a melt flow index of 41 g/10 min at 210° C./3800 g. The polymer produced above was extruded into 30 mil thick sheet on a 1 in. diameter single screw extruder made by Killion, Verona, N.J. The extruded sheet was then cut into test pieces and tested for properties according to ASTM method #E96-95 producing following results shown in Table III. The above-described compositions are suitable for at least cable, hoses, tubes and general purpose liners.

TABLE III

| Property | Conventional TPU PTMEG Based (100% Primary OH/ 0% Secondary OH content polyol)[A] | TPU from Example 3 | TPU from Example 3 |
|---|---|---|---|
| GPC Mw | — | 285650 | 263126 |
| Hardness, Shore A | 92 | 89 | 90 |
| Tensile Strength on films | 30 mils | 30 mils | |
| Stress at 50% Strain, psi | — | 1250 | 1270 |
| Stress at 100% Strain, psi | 1500 | 1480 | 1510 |
| Stress at 200% Strain, psi | — | 1860 | 1890 |
| Stress at 300% Strain, psi | 3000 | 2480 | 2530 |
| Stress at 400% Strain, psi | — | | |
| Stress at 500% Strain, psi | — | 4960 | 5270 |
| Stress at Break, psi | 6200 | 5230 | 5460 |
| Strain at Break, % | 500 | 510 | 510 |
| Specific Gravity | 1.14 | 1.16 | |
| Trouser Tear, lbf/in | | 139 | 151 |
| Taber Abrasion | | 2 | |
| CS-17 Wheel | 5 | | |
| H-22 Wheel | — | 116 | |
| Vicat[3], °C. | 96 | 98 | |

[A]Estane 58212 available from The B. F. Goodrich Company

The polymer of example 3 is also extruded into flexible pneumatic tubing of 8 mm OD and 1 mm wall thickness using a 2½' diameter single screw Killion extruder fitted with a tubing die. The extruder had 5 independently heated zones kept at temperatures from 193° C. to 205° C. The transition adapter and tubing die temperatures were set at 205° C. The extrusion rate was 110 lb/hr. at a screw speed of 30 rpm.

The breathability of films is strongly influenced by the ethylene oxide content of the high secondary/low primary hydroxyl content polyol and the hardness (polyol content of the TPU polymer). The moisture vapor transmission (MVT) of the polymer in Example 1 is adjusted for typical construction membrane applications but can be increased and decreased by adjusting the ethylene oxide content of the polyol and polyol content of the TPU polymer accordingly.

While in accordance with the patent statues the best mode and preferred embodiment have been set forth, the scope of the invention is not limited thereto, but rather by the scope of the attached claims.

What is claimed is:

1. A thermoplastic polyurethane comprising the reaction product of:
   a polyol component including a randomly polymerized polyether polyol having at least 75 percent by weight of propylene oxide repeat units and having a high secondary hydroxyl group content of about 51 to about 100 percent based on the total number of hydroxyl group present in said high secondary polyether polyols, and wherein the number average molecular weight of said polyol component is from about 800 to about 1,500, and wherein said polyol component has a hydroxyl functionality of from about 1.8 to about 2.2;
   a polyisocyanate;
   a chain extender; and
   a polyurethane catalyst,
   and wherein said thermoplastic polyurethane has a molecular weight of from about 75,000 to about 400,000 weight average.

2. The thermoplastic polyurethane according to claim 1, wherein said polyol component includes in an amount up to about 50 weight percent of a polyol having low secondary hydroxyl group content, and wherein said high secondary polyether polyol has been derived in the presence of a double metal cyanide catalyst.

3. The thermoplastic polyurethane according to claim 2, wherein the mole ratio of polyisocyanate functional groups to hydroxyl functional groups of the polyol component and the chain extender is from about 0.95 to about 1.10.

4. The thermoplastic polyurethane according to claim 3, wherein said polyisocyanate comprises diphenylmethane-4, 4'-diisocyanate (MDI), or methylene bis(4-cyclohexylisocyanate), or combinations thereof, and wherein said chain extender is 1,4-butanediol, ethylene glycol, diethylene glycol, 1,6-hexane diol, 1,4-cyclohexanedimethanol (HQEE), 1,4-benzenedimethyl, or combinations thereof.

5. The thermoplastic polyurethane according to claim 1, wherein said thermoplastic polyurethane has a molecular weight from about 125,000 to about 300,000, wherein said high secondary polyether polyol has a secondary hydroxyl group content of about 65 to about 90%, and wherein the mole ratio of polyisocyanate functional groups to hydroxyl functional groups of the polyol component and the chain extender is from about 0.98 to about 1.03.

6. The thermoplastic polyurethane according to claim 1, wherein said polyol component has hydroxyl functionality of from about 1.95 to about 2.05.

7. The thermoplastic polyurethane according to claim 1, wherein said polyol component includes less than or equal to 15 weight percent of said polyol having low secondary hydroxyl group content, and wherein said polyurethane catalyst is present in an amount from about 20 to about 500 parts by weight per million parts by weight of the total weight of said polyisocyanate, said polyol component, and said chain extender.

8. The thermoplastic polyurethane according to claim 1, wherein said thermoplastic polyurethane has a molecular weight from about 150,000 to about 250,000.

9. The thermoplastic polyurethane according to claim 1, wherein said polyurethane is in the form of a film having a thickness from about 0.5 mils to about 10 mils.

10. The thermoplastic polyurethane according to claim 9, wherein said polyurethane film has a moisture vapor transmission rate greater than 2,000 grams per square meter per day.

11. A polyurethane composition, comprising:
   a polyol component including a randomly polymerized polyether polyol having at least 75 percent by weight of propylene oxide repeat units and having a high secondary hydroxyl group content of about 51 to about 100 percent based on the total number of hydroxyl groups present in said high secondary polyether polyol, and wherein the number average molecular weight of said polyol component is from about 800 to about 1,500, and wherein said polyol component has hydroxyl functionality of from about 1.8 to about 2.2;
   a polyisocyanate;
   a chain extender; and
   a polyurethane catalyst,
   said polyurethane being a thermoplastic substantially free of cross-links,
   and wherein said thermoplastic polyurethane has a molecular weight of from about 75,000 to about 400,000 weight average.

12. The polyurethane composition according to claim 11, wherein said polyol component includes up to about 50 weight percent of a polyol having low secondary hydroxyl group content, and wherein said high secondary polyether polyol has been derived in the presence of a double metal cyanide catalyst.

13. The polyurethane composition according to claim 12, wherein the mole ratio of polyisocyanate functional groups to the total hydroxyl functional groups of the polyol component and the chain extender is from about 0.95 to about 1.10.

14. The polyurethane composition according to claim 13, wherein said polyisocyanate comprises diphenylmethane-4,4'-diisocyanate (MDI), or methylene bis(4-cyclohexylisocyanate), or combinations thereof, and wherein said chain extender is 1,4-butanediol, ethylene glycol, diethylene glycol, 1,6-hexane diol, 1,4-cyclohexanedimethanol (HQEE), 1,4-benzenedimethylol, or combinations thereof.

15. The polyurethane composition according to claim 11, wherein said thermoplastic polyurethane has a molecular weight from about 125,000 to about 300,000, wherein said high secondary polyether polyol has a secondary hydroxyl group content of about 65 to about 90%, and wherein the mole ratio of polyisocyanate functional groups to the total hydroxyl functional groups of the polyol component and the chain extender is from about 0.98 to about 1.03.

16. The polyurethane composition according to claim 11, wherein said polyol component has a hydroxyl functionality of from about 1.95 to about 2.05.

17. The polyurethane composition according to claim 11, wherein said polyol component includes less than or equal to 15 weight percent of said polyol having low secondary hydroxyl group content, and wherein said polyurethane catalyst is present in an amount from about 20 to about 500 parts by weight per million parts by weight of the total weight of said polyisocyanate, said polyol component, and said chain extender.

18. The polyurethane composition according to claim 11, wherein said thermoplastic polyurethane has a molecular weight from about 150,000 to about 250,000.

19. The polyurethane composition according to claim 11, wherein said polyurethane has been formed into a film having a thickness from about 0.5 mils to about 10 mils.

20. The polyurethane composition according to claim 19, wherein said polyurethane film has a moisture vapor transmission rate greater than 2,000 grams per square meter per day.

21. A process for preparing a thermoplastic polyurethane composition, comprising:
reacting in substantially a single step a composition comprising:
a polyol component including a randomly polymerized polyether polyol having at least 75 percent by weight of propylene oxide repeat units and having a high secondary hydroxyl group content of about 51 to about 100 percent based on the total number of hydroxyl group present in said polyether polyol, and wherein the number average molecular weight of said polyol component is from about 800 to about 1,500, and wherein said polyol component has hydroxyl functionality of from about 1.8 to about 2.2;
a polyisocyanate;
a chain extender; and
a polyurethane catalyst,
wherein said thermoplastic polyurethane is substantially linear, and wherein said thermoplastic polyurethane has a molecular weight of from about 75,000 to about 400,000 weight average.

22. The process for preparing a thermoplastic polyurethane composition according to claim 21, wherein said polyol component includes up to about 50 weight percent of a polyol having low secondary hydroxyl group content, and wherein said high secondary polyether polyol has been derived in the presence of a double metal cyanide catalyst.

23. The process for preparing a thermoplastic polyurethane composition according to claim 22, wherein the mole ratio of polyisocyanate functional groups to the total hydroxyl functional groups of the polyol component and the chain extender is from about 0.95 to about 1.10.

24. The process for preparing a thermoplastic polyurethane composition according to claim 23, wherein said polyisocyanate comprises diphenylmethane-4,4'-diisocyanate (MDI), or methylene bis(4-cyclohexylisocyanate), or combinations thereof, and wherein said chain extender is 1,4-butanediol, ethylene glycol, diethylene glycol, 1,6-hexane diol, 1,4-cyclohexanedimethanol (HQEE), 1,4-benzenedimethylol, or combinations thereof.

25. The process for preparing a thermoplastic polyurethane composition according to claim 22, wherein said thermoplastic polyurethane has a molecular weight from about 125,000 to about 300,000, wherein said high secondary polyether polyol has a secondary hydroxyl group content of about 65 to about 90%, and wherein the mole ratio of polyisocyanate functional groups to the total hydroxyl functional groups of the polyol component and the chain extender is from about 0.98 to about 1.03.

26. The process for preparing a thermoplastic polyurethane composition according to claim 25, wherein said polyol component has a hydroxyl functionality of from about 1.95 to about 2.05.

27. The process for preparing a thermoplastic polyurethane composition according to claim 26, wherein said polyol component includes less than or equal to 15 weight percent of said polyol having low secondary hydroxyl content, and wherein said polyurethane catalyst is present in an amount from about 20 to about 500 parts by weight per million parts by weight of the total weight of said polyisocyanate, said polyol component, and said chain extender.

28. The process for preparing a thermoplastic polyurethane composition according to claim 27, wherein said thermoplastic polyurethane has a molecular weight from about 150,000 to about 250,000.

29. The process for preparing a thermoplastic polyurethane composition according to claim 28, wherein said polyurethane has been formed into a film having a thickness from about 0.5 mils to about 10 mils.

30. The process for preparing a thermoplastic polyurethane composition according to claim 29, wherein said polyurethane film has a moisture vapor transmission rate greater than 2,000.

* * * * *

UNITED STATES PATENT AND TRADEMARK OFFICE
CERTIFICATE OF CORRECTION

PATENT NO.   : 6,734,273 B2
DATED        : May 11, 2004
INVENTOR(S)  : Kemal Onder It is certified that error appears in the above-identified patent and that said Letters Patent is hereby corrected as shown below:

Column 12,
Line 13, please delete "1,4-benzenedimethyl," and insert -- 1,4-benzenedimethylol, --.

Signed and Sealed this

Twenty-first Day of December, 2004

JON W. DUDAS
*Director of the United States Patent and Trademark Office*